United States Patent
Willars et al.

(10) Patent No.: US 8,516,550 B2
(45) Date of Patent: Aug. 20, 2013

(54) SYSTEMS AND METHODS FOR ENABLING A SERVICE PROVIDER TO OBTAIN AND USE USER INFORMATION

(75) Inventors: Per Willars, Vaxholm (SE); Robert Skog, Hasselby (SE); Ulf Olsson, Sollentuna (SE); Steinar Dahlin, Jarfalla (SE); Clary Hallberg Dahlin, legal representative, Jarfalla (SE); Michael Astrom, Ronninge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 449 days.

(21) Appl. No.: 12/667,933

(22) PCT Filed: Jun. 11, 2008

(86) PCT No.: PCT/SE2008/050701
§ 371 (c)(1),
(2), (4) Date: Jan. 6, 2010

(87) PCT Pub. No.: WO2009/008809
PCT Pub. Date: Jan. 15, 2009

(65) Prior Publication Data
US 2010/0325691 A1 Dec. 23, 2010

(30) Foreign Application Priority Data
Jul. 6, 2007 (SE) .................................. 0701655

(51) Int. Cl.
G06F 17/30 (2006.01)
H04L 29/06 (2006.01)
G06F 21/00 (2013.01)

(52) U.S. Cl.
CPC ............... H04L 63/08 (2013.01); G06F 21/00 (2013.01)
USPC ................................................. 726/2; 726/30

(58) Field of Classification Search
USPC ........................................................ 726/2, 30
See application file for complete search history.

(56) References Cited

U.S. PATENT DOCUMENTS

| | | | | |
|---|---|---|---|---|
| 6,226,752 B1 * | 5/2001 | Gupta et al. | ....................... | 726/9 |
| 6,463,292 B1 * | 10/2002 | Rahman | ....................... | 455/466 |
| 6,636,894 B1 * | 10/2003 | Short et al. | ..................... | 709/225 |
| 7,188,252 B1 * | 3/2007 | Dunn | ............................ | 713/182 |

(Continued)

FOREIGN PATENT DOCUMENTS

| | | |
|---|---|---|
| GB | 2372175 A | 8/2002 |
| JP | 2004213694 A | 7/2004 |

OTHER PUBLICATIONS

Office Action issued on Mar. 4, 2013 in corresponding Chinese application No. 200880023519.4, 3 pages (English translation).

*Primary Examiner* — Peter Shaw
(74) *Attorney, Agent, or Firm* — Rothwell, Figg, Ernst & Manbeck, P.C.

(57) ABSTRACT

In one aspect, the present invention provides a method for providing user information to a service provider. The method may include receiving a message including a communication device identifier; storing the communication device identifier with an identifier associated with a user of the communication device so that the communication device identifier is associated with the user identifier; transmitting a consent request message to the user; receiving a response to the consent request message, which response indicates that the user has provided the requested consent; and in response to receiving the response to the consent request message, transmitting a consent confirmation message to the service provider.

17 Claims, 17 Drawing Sheets

(56) References Cited

U.S. PATENT DOCUMENTS

| | | |
|---|---|---|
| 2002/0087337 A1 | 7/2002 | Hensley |
| 2004/0224702 A1* | 11/2004 | Chaskar .................. 455/456.3 |
| 2006/0026042 A1* | 2/2006 | Awaraji et al. .................. 705/3 |
| 2007/0101145 A1 | 5/2007 | Sachdeva et al. |
| 2009/0193512 A1* | 7/2009 | Buckley et al. .................. 726/9 |

\* cited by examiner

TO REGISTER, PLEASE ENTER A USERNAME/PASSWORD AND PROVIDE YOUR CONSENT TO USE YOUR USER INFORMATION

USERNAME: ☐
PASSWORD: ☐

☐ I CONSENT TO THE SERVICE PROVIDER USING MY USER INFORMATION

[SUBMIT] [CANCEL]

FIG.4

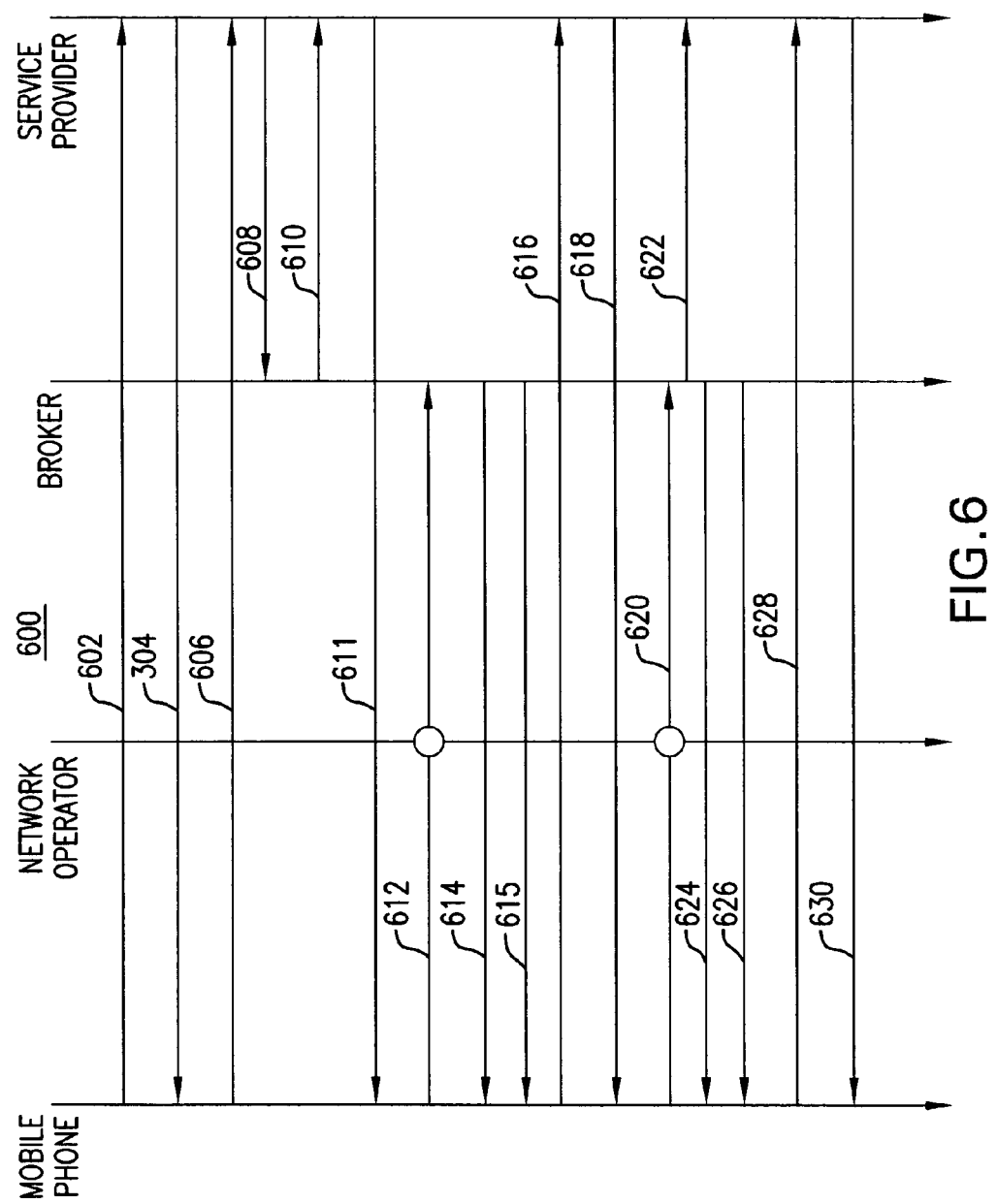

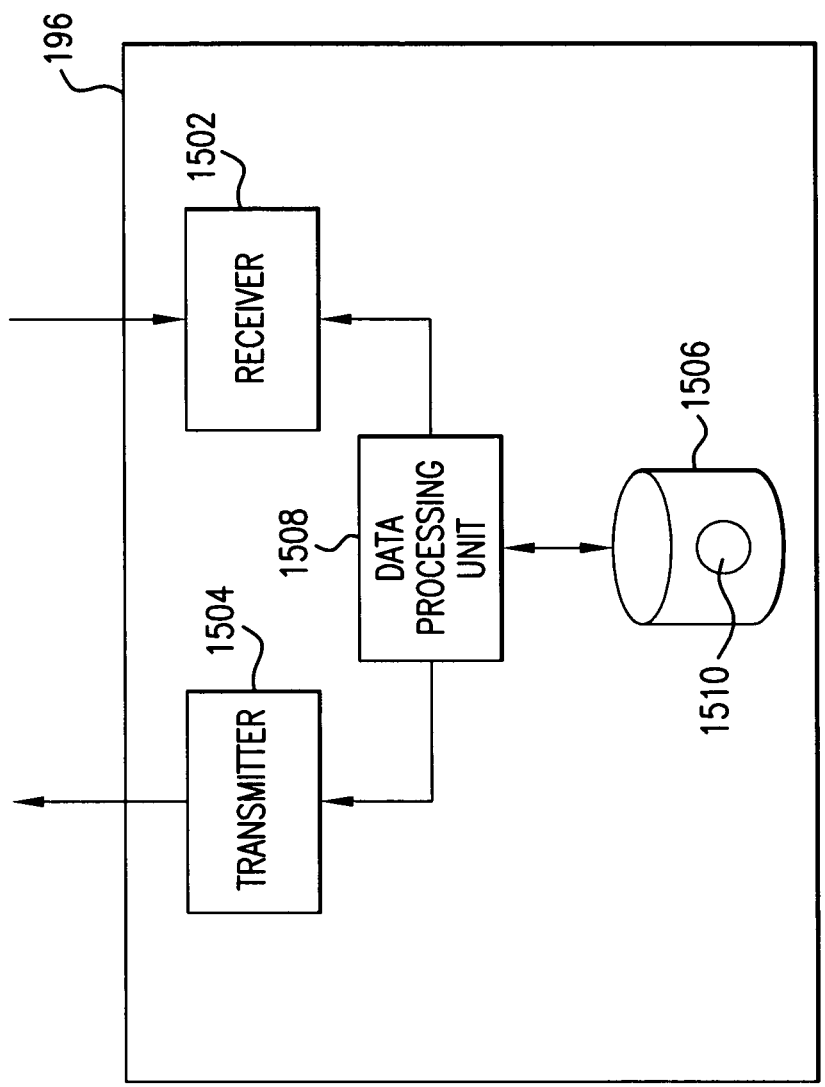

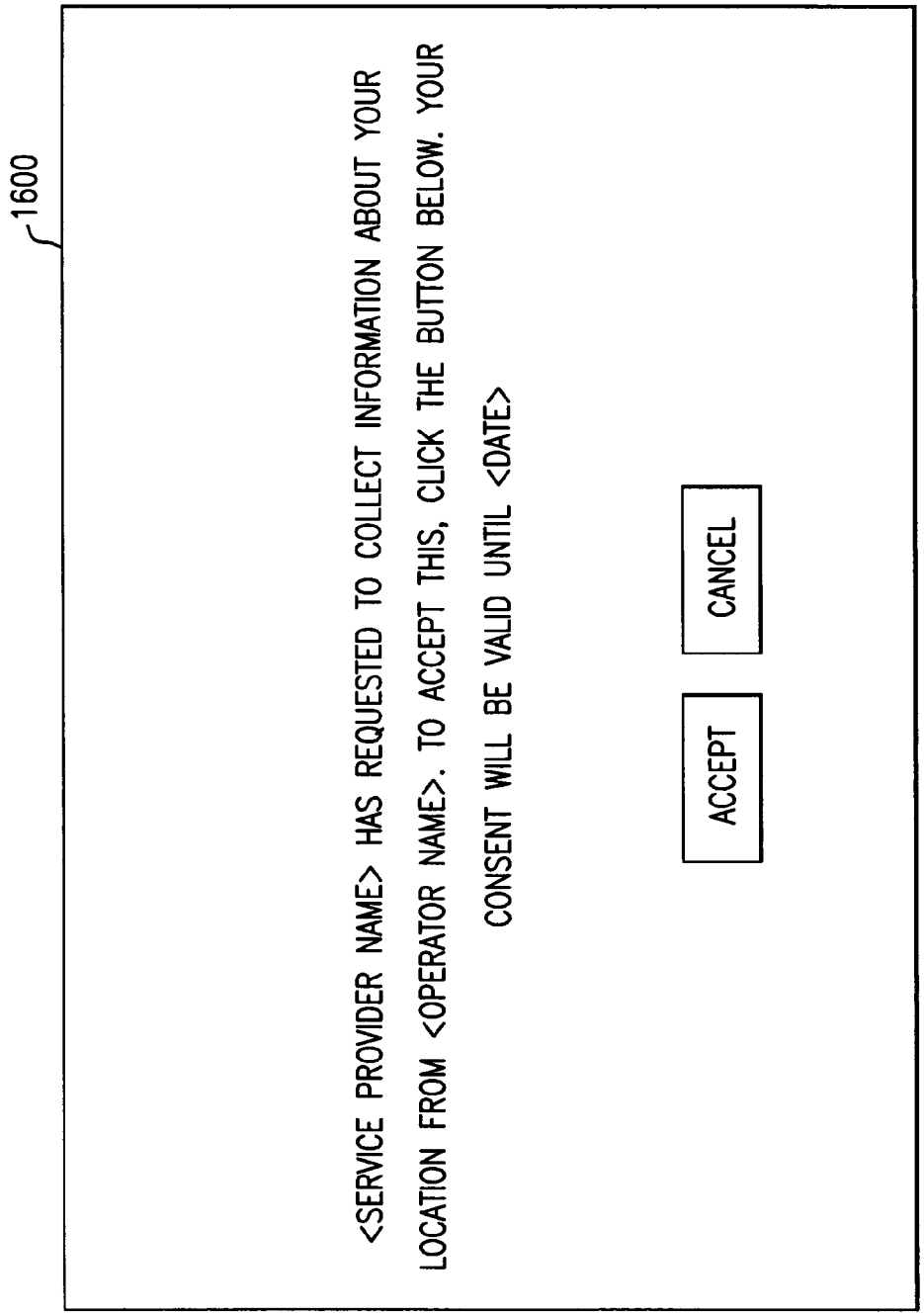

SYSTEMS AND METHODS FOR ENABLING A SERVICE PROVIDER TO OBTAIN AND USE USER INFORMATION

CROSS-REFERENCE TO RELATED APPLICATIONS

This application is a 35 U.S.C. §371 National Phase Application from PCT/SE2008/050701, filed Jun. 11, 2008, and designating the United States, which claims the benefit of Sweden Patent Application No. 0701655-3, filed Jul. 6, 2007.

TECHNICAL FIELD

The present invention relates generally to systems and methods for enabling a service provider (e.g., an Internet-based service provider) to obtain user information from a network operator.

BACKGROUND

An Internet-based service provider provides its services to its users regardless of which network operator provides Internet access for the user. Network operators owning the access and the subscription of a user often have additional capabilities/enablers beyond best effort transport of bits. Such capabilities/enablers could include information about the user or the user's device (hereafter "user information"). For example, such user information could include: the location of the user's device, the availability of the user's device, information from the user's profile, etc.

Such user information may be provided to Internet service providers for a fee so that the service providers can enhance their service offerings and/or provide targeted advertisements to keep a service free of charge. Of course, privacy is a key concern for users. That is, for example, an operator should not forward potentially sensitive information about a user to a service provider unless the user has given his/her consent and/or the identity of the user is sufficiently hidden.

In one business model, a service provider that wants to obtain such user information from network operators makes a business agreement and a technical integration with each network operator whose users the service provider wants to reach. But, this is an impractical solution because the service provider typically wants to reach users of many different operators.

What is desired are systems and methods for enabling a service provider to obtain user information while, at the same time, ensuring that the users' privacy concerns are met.

SUMMARY

In one aspect, the present invention provides a method for providing user information to a service provider. In some embodiments, the method includes: receiving at a broker server a message including a communication device identifier associated with a communication device; storing the communication device identifier with an identifier associated with a user of the communication device so that the communication device identifier is associated with the identifier associated with the user (e.g., a broker-provided user alias); transmitting from the broker server a consent request message to the user; receiving from the user a response to the consent request message, which response indicates that the user has provided the requested consent; and in response to receiving the response to the consent request message, transmitting a consent confirmation message to the service provider.

The communication device identifier may be (i) a Mobile Systems International Subscriber Identity Number (MSISDN) associated with the communication device or (ii) an alias associated with a MSISDN associated with the communication device.

In some embodiments, the method further includes: (a) receiving an activate message from the service provider prior to receiving the message that includes the communication device identifier; (b) in response to the activate message, generating or selecting an alias and transmitting an alias response message to the service provider, wherein the alias response message includes an alias identifier for identifying the generated or selected alias (e.g., the alias response message my include the generated or selected alias); (c) receiving from the service provider an information request message that includes the alias identifier; (d) in response to receiving the information request message, using the alias identifier to retrieve a communication device identifier associated with the alias identifier; (e) transmitting to a user information server that stores user information a second information request message, wherein the second information request message includes the retrieved communication device identifier; (f) receiving from the user information server user information concerning the device identified by the communication device identifier; and (g) transmitting an information response message to the service provider, which information response message includes the user information.

In some embodiments, the step of transmitting the consent request message to the user is performed in response to receiving the message that includes the communication device identifier. The consent request message may be (i) a web page or (ii) transmitted using a short message service (SMS) or other text messaging protocol.

In some embodiments, the method further includes: (i) transmitting a text message to the communication device in response to receiving the response to the consent request message, wherein the text message (a) indicates that the user's consent to forward user information to the service provider has been received and (b) includes a link that the user can activate if the user desires to revoke the consent; and (ii) transmitting a redirect message to the communication device in response to receiving the response to the consent request message, wherein the redirect message cause the communication device to send a message to the service provider.

In some embodiments, the step of receiving the message including the communication device identifier comprises receiving said message from a computer operated by a user of the communication device. In these embodiments, the method may further include transmitting to the computer a form for enabling the user to cause the computer to transmit the message including the communication device identifier, wherein this transmitting step occurs prior to the step of receiving the message including the communication device identifier.

In another aspect, the present invention provides a computer apparatus for providing user information to a service provider. In some embodiments, the computer apparatus is programmed and configured to: (a) receive a message including a communication device identifier associated with a communication device; (b) store the communication device identifier with an identifier associated with a user of the communication device so that the communication device identifier is associated with the identifier associated with the user; (c) transmit a consent request message to the user; (d) receive from the user a response to the consent request message, which response indicates that the user has provided the requested consent; and (e) in response to receiving the response to the consent request message, transmit a consent confirmation message to the service provider.

In another aspect, the present invention provides a system for providing user information to a service provider. In some embodiments, the system includes: a service provider server; a user information server; and a broker server communicatively coupled to the service provider server and the user information server, wherein the broker server comprises: a receiver; a transmitter; a storage unit; and a data processing unit coupled to the receiver, transmitter and storage unit, and the data processing unit is operable to: use the receiver to receive a message including a communication device identifier associated with a communication device; store in the storage unit the communication device identifier with an identifier associated with a user of the communication device so that the communication device identifier is associated with the identifier associated with the user; use the transmitter to transmit a consent request message to the user; use the receiver to receive from the user a response to the consent request message, which response indicates that the user has provided the requested consent; and in response to receiving the response to the consent request message, use the transmitter transmit a consent confirmation message to the service provider.

The above and other aspects and embodiments of the present invention are described below with reference to the accompanying drawings.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements.

FIG. 4 illustrates an exemplary web page.

FIG. 6 is a data flow diagram illustrating a data flow according to an embodiment of an aspect of the invention.

FIG. 15 is a functional block diagram of a broker server according to an embodiment of the invention.

FIG. 16 illustrates an example web page.

DETAILED DESCRIPTION

In accordance with various embodiments of the present invention, rather than making an agreement and integration with many different network operators, service providers make an agreement and a technical integration with a single party (also known as "a broker") that has previously made agreements and integrations with many operators (e.g., all operators in a given market). This arrangement is illustrated in FIG. 1.

Figure 1:
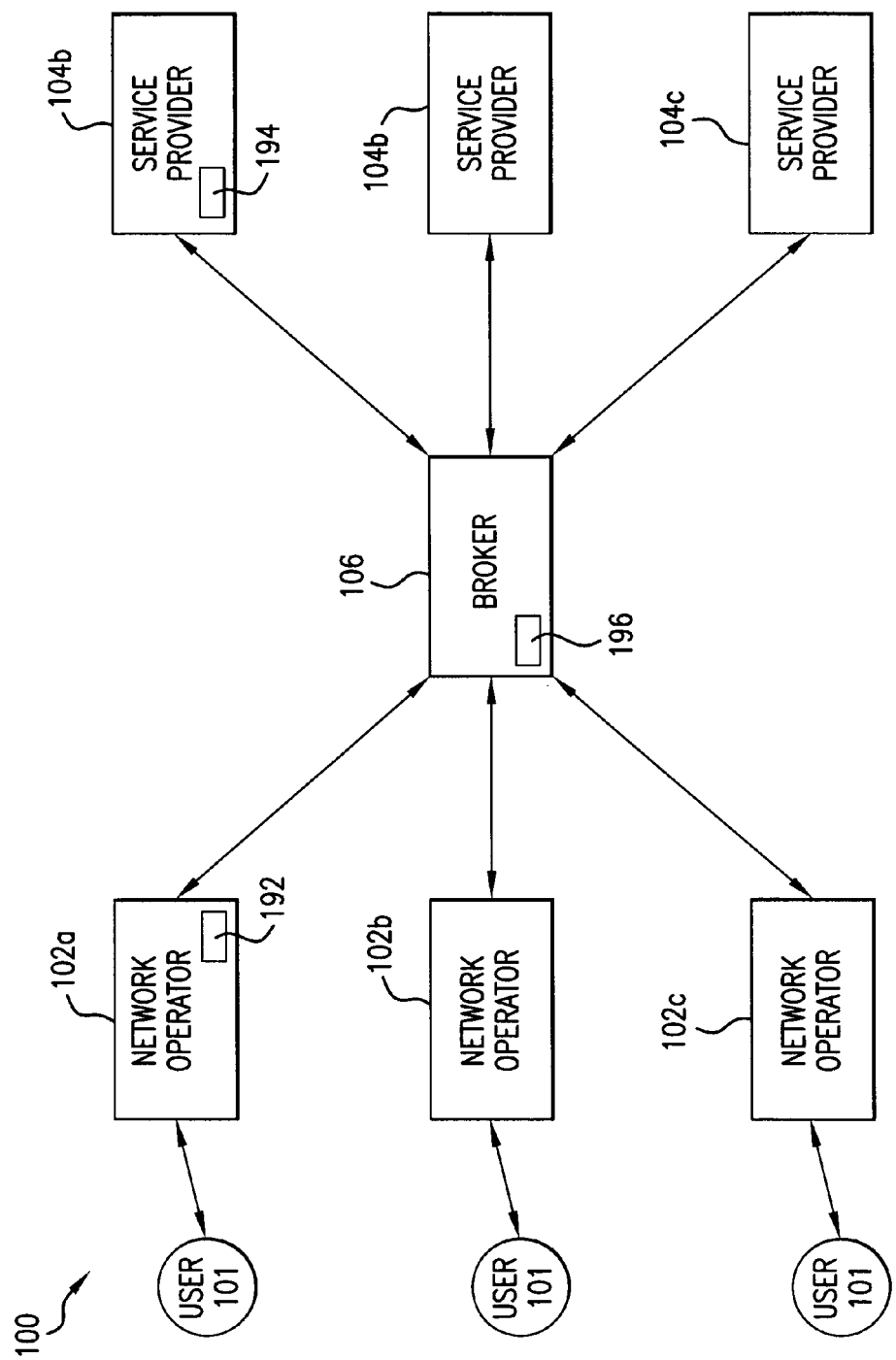
FIG. 1 is a block diagram illustrating the architecture of a system according to an embodiment of the invention.

Referring now to FIG. 1, FIG. 1 illustrates several network operators (i.e., network operators 102a, 102b, and 102c), each of which provides network services to a plurality of users 101. FIG. 1 also illustrates several service providers (i.e., service providers 104a, 104b and 104c), each of which desires to obtain information about users 101. As shown in FIG. 1, a broker 106 is positioned logically between network operators 102 and service provider 104. As described above, rather than have each service provider 104 enter into an agreement with each operator 102, one or more service providers 104 enters into an agreement with broker 106, which has entered into an agreement with one or more operators 102. Thus, the broker is connected to multiple operators on one side and multiple service providers on the other side. Although the broker 106 is shown in FIG. 1 as being separate from the network operators 102, this was done merely for illustration as broker 106 may be owned and/or operated by a network operator 102.

Described below are systems and methods for providing user privacy in the broker business model illustrated in FIG. 1.

In some embodiments, in the broker business model, when a service provider 104 desires to obtain user information concerning a user 101, two consents must be received from user 101: first, service provider 104 must receive from user 101 consent for the service provider to collect and use the user information, and second, user 101's operator 102 (or broker 106) must receive from user 101 consent to allow the operator 102 (or broker 106) to forward the user information to service provider 104.

Figure 2:
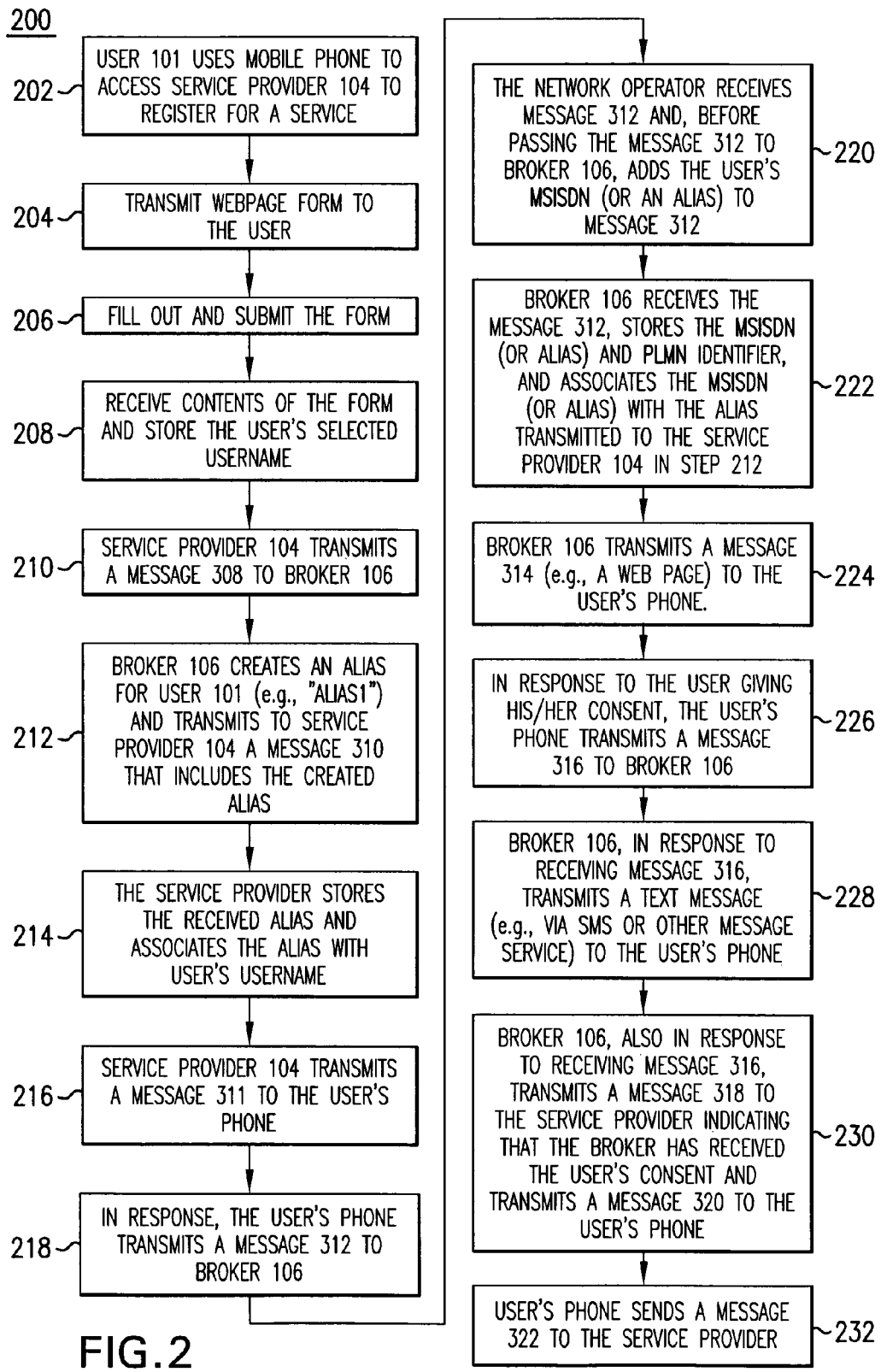
FIG. 2 is a flow chart illustrating a process according to an embodiment of an aspect of the invention.

Referring now to FIG. 2, FIG. 2 is a flow chart illustrating a process 200, according to an embodiment of the invention, for receiving consent from a user who is using his/her wireless communication device (e.g., mobile phone or other wireless communication device) to sign up for the service provided by the service provider. Process 200 may begin in step 202, where a user 101 uses a mobile phone to access a server 194 (e.g., an HTTP server or web server) of a service provider 104 for the purpose of registering for a service provided by service provider 104. In this example, the service provided by service provider 104 is a location-based service.

Figure 3:
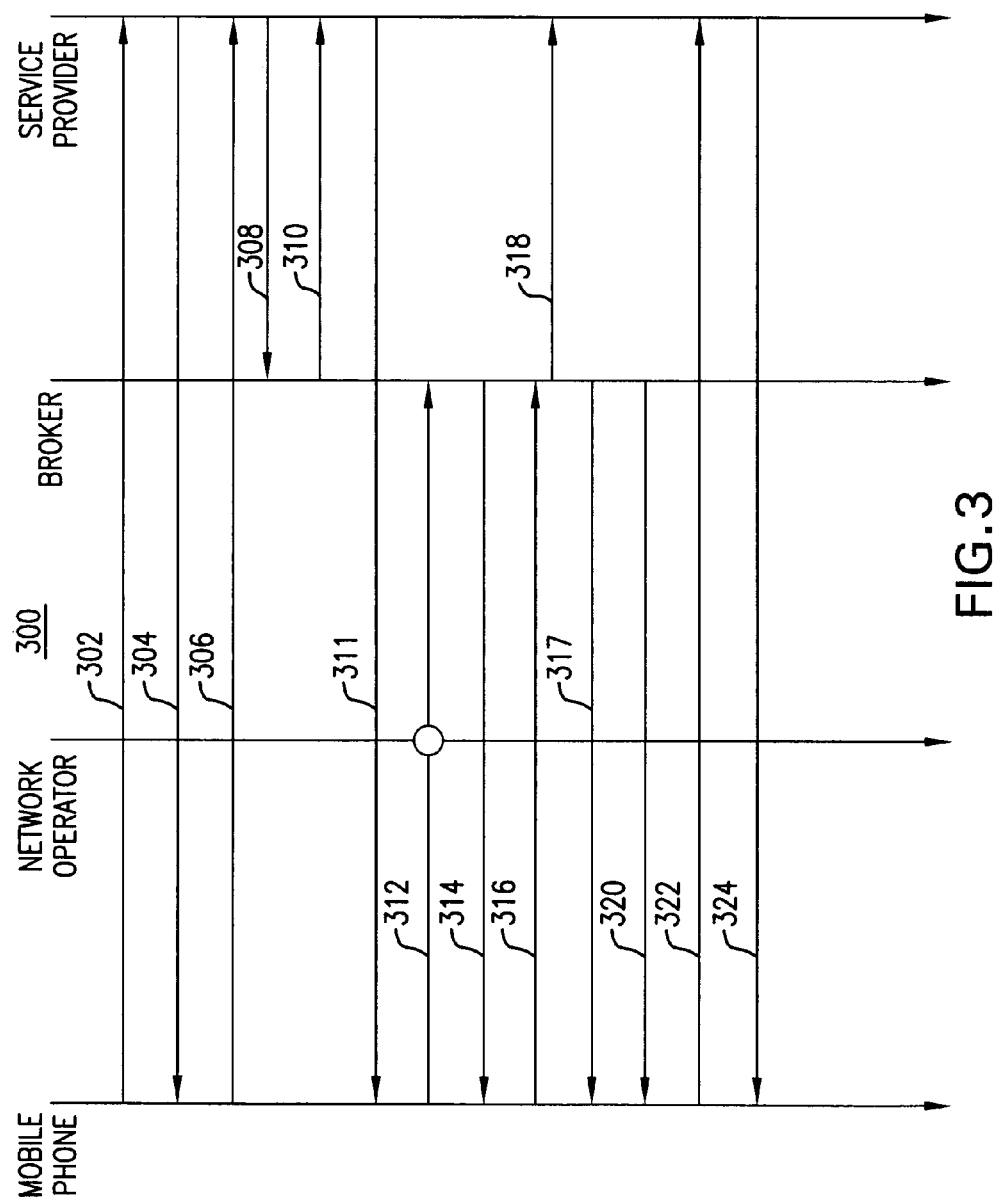
FIG. 3 is a data flow diagram illustrating a data flow according to an embodiment of an aspect of the invention.

More specifically, as shown in the data flow diagram 300 (see FIG. 3), in step 202, user 101's mobile phone transmits to service provider 104 (e.g., to service provider server 194) a message 302 (e.g., message 302 may be an HTTP GET request). In response to receiving message 302, service provider 104 transmits a webpage 304 (or other message) to user 101 (step 204). An exemplary webpage 304 is illustrated in FIG. 4.

As shown in FIG. 4, if user 101 would like to register for the service provided by service provider 104, user 101 fills out and submits the form included in the webpage (step 206). As shown, the form includes an input field for the user to enter a username, a checkbox to indicate that the user consents to allow service provider to make use of user 101's user information, and a submit button. When the user presses the submit button, a message 306 that includes the user's username is transmitted back to service provider 104. As further shown in FIG. 3, the message 306 passes through the operator 102 that provides network services to the user (e.g., operator 102 is the user's wireless telephone service provider).

In step 208, service provider 104 receives message 306 and stores the username included in the message. In step 210, in response to receiving message 306, which signals the user's consent to allow service provider 104 to use user information related to user 101, service provider 104 transmits an activate message 308 to a broker server 196 operated and/or owned by or on behalf of broker 106. Message 308 may be transmitted using the SOAP protocol or other protocol.

In step 212, in response to receiving activate message 308, broker 106 (e.g., broker server 196) creates an alias for user 101 (e.g., "alias1") and transmits to service provider 104 a message 310 that includes the created alias. Message 310 may also include a URI (e.g., a URL) that includes a unique transaction identifier. The transaction identifier may be or include the created alias, however, it is preferred that the alias not be part of the transaction identifier. The service provider stores the received alias and associates the alias with user 101's username (step 214).

Next (step 216), service provider 104 transmits a message 311 to the user's phone, which message may include the URI. This message 311 causes the user's phone to send a message 312 to broker 106 (e.g., message 311 may be an HTTP redirect message, the URI may identify broker 106, and message 312 may be an HTTP Get request message) (step 218). Message 312 preferably includes the transaction identifier.

In step 220, the network operator receives message 312 and, before passing the message 312 to broker 106, the operator's gateway adds the user's MSISDN (or an operator provided alias associated with the user MSISDN) to message 312 so that the broker 106 will receive the user's MSISDN (or alias) along with message 312. The operator may also include a public land mobile network (PLMN) identifier in message 312.

In step 222, broker 106 receives the message 312, which contains the user's MSISDN (or MSISDN alias), stores the MSISDN (or alias) and PLMN identifier, and associates the MSISDN (or alias) with the alias transmitted to the service provider 104 in step 212. Message 312 may include the transaction identifier so that broker 106 can correlate message 312 with message 310.

In step 224, after processing message 312, broker 106 transmits a message 314 (e.g., a web page) to the user's phone. This webpage asks the user to consent to allow the broker to forward user information to the service provider. The user may give the consent by clicking a button or hyperlink or checking a box. In response to the user giving his/her consent, the user's phone transmits a message 316 to broker 106, which message includes information indicating that the user has given his/her consent (step 226). An example web page 1600 is illustrated in FIG. 16.

In step 228, broker 106, in response to receiving message 316, transmits a text message 317 (e.g., via SMS or other text message service) to the user's phone. The message indicates to the user that the broker has received the user's consent to forward user information to the service provider. Preferably, the text message includes a link that the user can activate if the user desires to revoke the consent.

In step 230, broker 106, also in response to receiving message 316, transmits a message 318 to the service provider indicating that the broker has received the user's consent and transmits a message 320 to the user' phone. Message 320 is a redirect message that causes the user's phone to send a message 322 (e.g., an HTTP GET request message) to the service provider (step 232). The service provider responds to message 322 by transmitting a message 324 (e.g., a web page) to the user's phone. Message 324 informs the user that registration is complete.

Figure 5A:
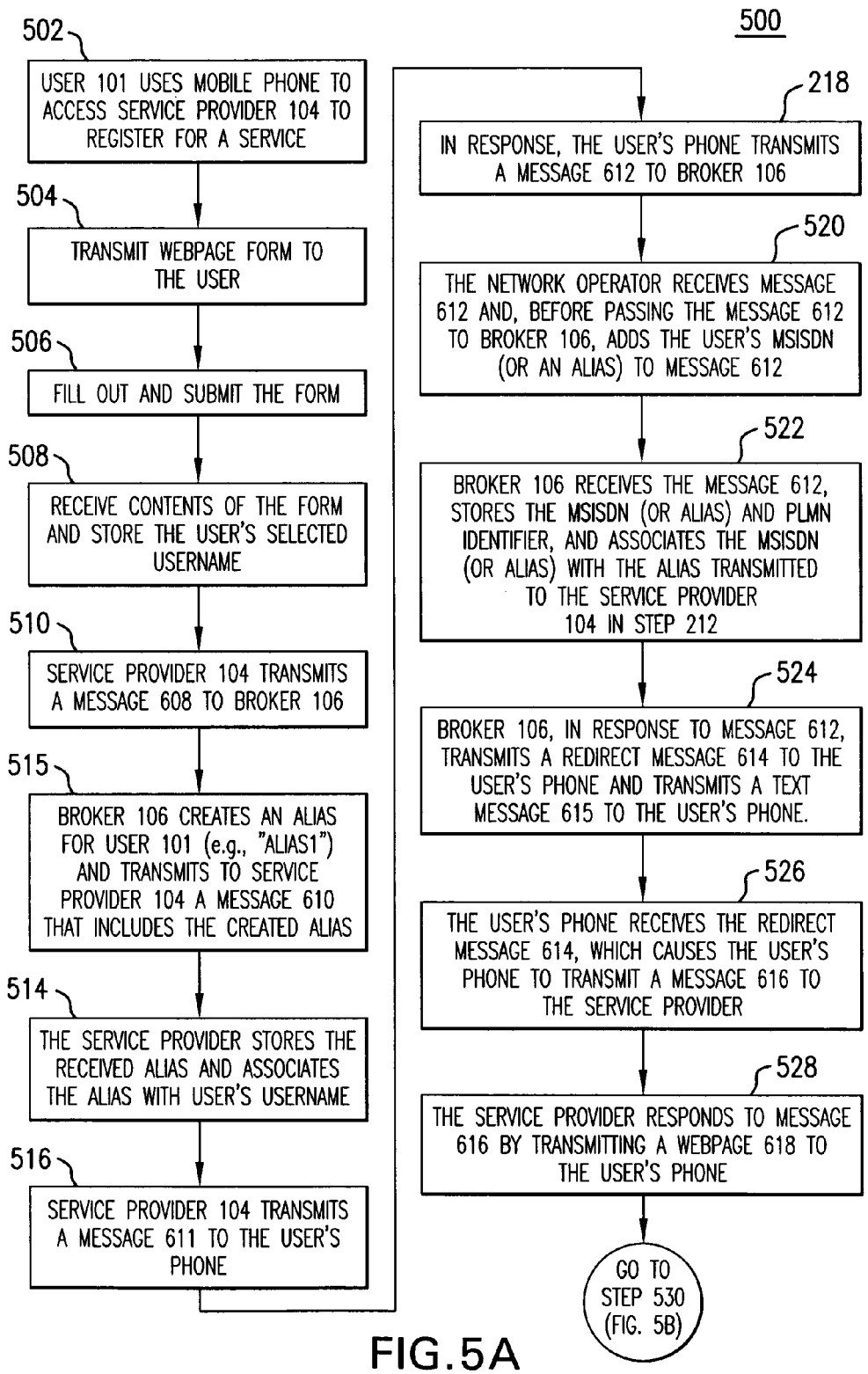
FIG. 5a-b is a flow chart illustrating a process according to an embodiment of an aspect of the invention.
Figure 5B:
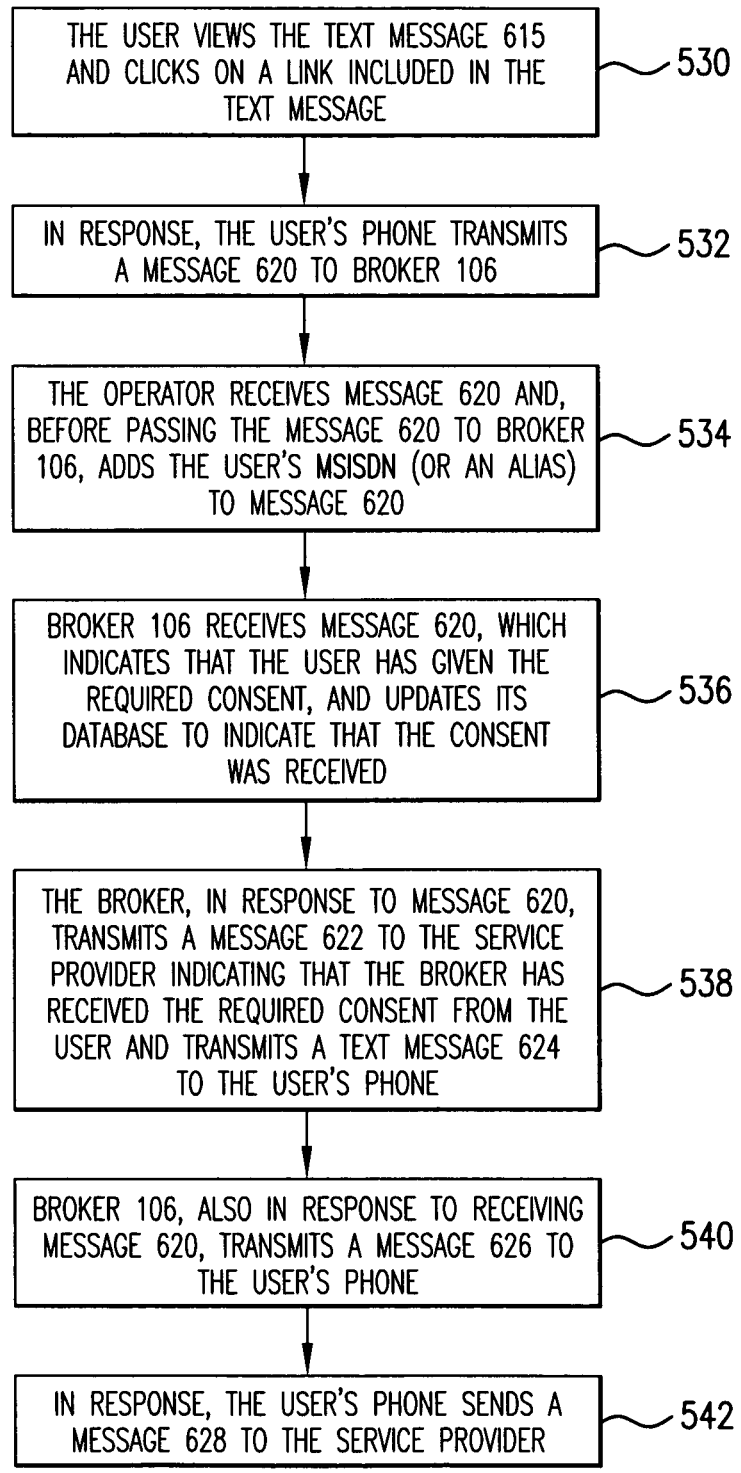

Referring now to FIG. 5a-b, FIG. 5a-b is a flow chart illustrating a process 500, according to another embodiment of the invention, for receiving consent from a user who is using his/her mobile phone to sign up for a service provided by a service provider. Process 500 may begin in step 502, where a user 101 uses a mobile phone to access the website of the service provider 104 for the purpose of registering for a service provided by service provider 104.

More specifically, as shown in the data flow diagram 600 (see FIG. 6), in step 502, user 101's mobile phone transmits to service provider 104 a message 602 (e.g., message 602 may be an HTTP GET request). In response to receiving message 602, service provider 104 transmits a webpage 304 (or other message) to user 101 (step 504).

As shown in FIG. 4, if user 101 would like to register for the service provided by service provider 104, user 101 fills out and submits the form included in the webpage (step 506). As shown, the form includes an input field for the user to enter a username, a checkbox to indicate that the user consents to allow service provider to make use of user 101's user information, and a submit button. When the user presses the submit button, a message 606 that includes the user's username is transmitted back to service provider 104. As further shown in FIG. 6, the message 606 passes through the operator 102 that provides network services to the user (e.g., operator 102 is the user's wireless telephone service provider).

In step 508, service provider 104 receives message 606 and stores the username included in the message. In step 510, in response to receiving message 606, which signals the user's consent to allow service provider 104 to use user information related to user 101, service provider 104 transmits a message 608 to broker 106. Message 608 may be transmitted using the SOAP protocol or other protocol.

In step 512, in response to receiving message 608, broker 106 creates an alias for user 101 (e.g., "alias1") and transmits to service provider 104 a message 610 that includes the created alias. Message 610 may also include a URI that includes a unique alias identifier (a.k.a., "transaction identifier"), which transaction identifier may be or include the created alias. The service provider stores the received alias and associates the alias with user 101's username (step 514).

Next (step 516), service provider 104 transmits a message 611 to the user's phone, which message may include the URI. This message 611 causes the user's phone to send a message 612 to broker 106 (e.g., message 611 may be an HTTP redirect message, the URI may identify broker 106, and message 612 may be an HTTP Get request message) (step 518). Message 612 preferably includes the transaction identifier.

In step 520, the operator receives message 612 and, before passing the message 612 to broker 106, adds the user's MSISDN (or an alias associated with the user's MSISDN) to message 612 so that the broker 106 will receive the user's MSISDN (or alias) along with message 612. The operator may also include a public land mobile network (PLMN) identifier in message 612.

In step 522, broker 106 receives the message 612, which contains the user's MSISDN (or alias), stores the MSISDN (or alias) and PLMN identifier, and associates the MSISDN (or alias) with the alias transmitted to the service provider 104 in step 512. Preferably, message 612 includes the transaction identifier so that broker 106 can correlate message 612 with message 610.

In step 524, broker 106, in response to message 612, transmits a redirect message 614 to the user's phone and transmits a text message 615 to the user's phone. The user's phone receives the redirect message 614, which causes the user's phone to transmit a message 616 to the service provider (step 526). In step 528, the service provider responds to message 616 by transmitting a webpage 618 to the user's phone, which web page informs the user that user will receive a text message that will enable the user to complete the sign-up process.

In step 530, the user views the text message 615 and clicks on a link included in the text message. This causes the user's phone to transmit a message 620 to broker 106 (step 532). In step 534, the operator receives message 620 and, before passing the message 620 to broker 106, adds the user's MSISDN (or an alias associated with the user's MSISDN) to message 620 so that the broker 106 will receive the user's MSISDN (or alias) along with message 620. The operator may also include a public land mobile network (PLMN) identifier in message 620.

In step 536, broker 106 receives message 620, which indicates that the user has given the required consent, and updates its database to indicate that the consent was received. In step 538, broker 106, in response to message 620, transmits a message 622 to the service provider indicating that the broker has received the required consent from the user and transmits a text message 624 to the user's phone. The text message 624 indicates to the user that the broker has received the user's consent to forward user information to the service provider. Preferably, the text message includes a link that the user can activate if the user desires to revoke the consent.

In step 540, broker 106, also in response to receiving message 620, transmits a message 626 to the user' phone. Message 626 is a redirect message that causes the user's phone to send a message 628 (e.g., an HTTP GET request message) to the service provider (step 542). The service provider responds to message 628 by transmitting a message 630 (e.g., a web page) to the user's phone. Message 630 informs the user that registration is complete.

Figure 7:
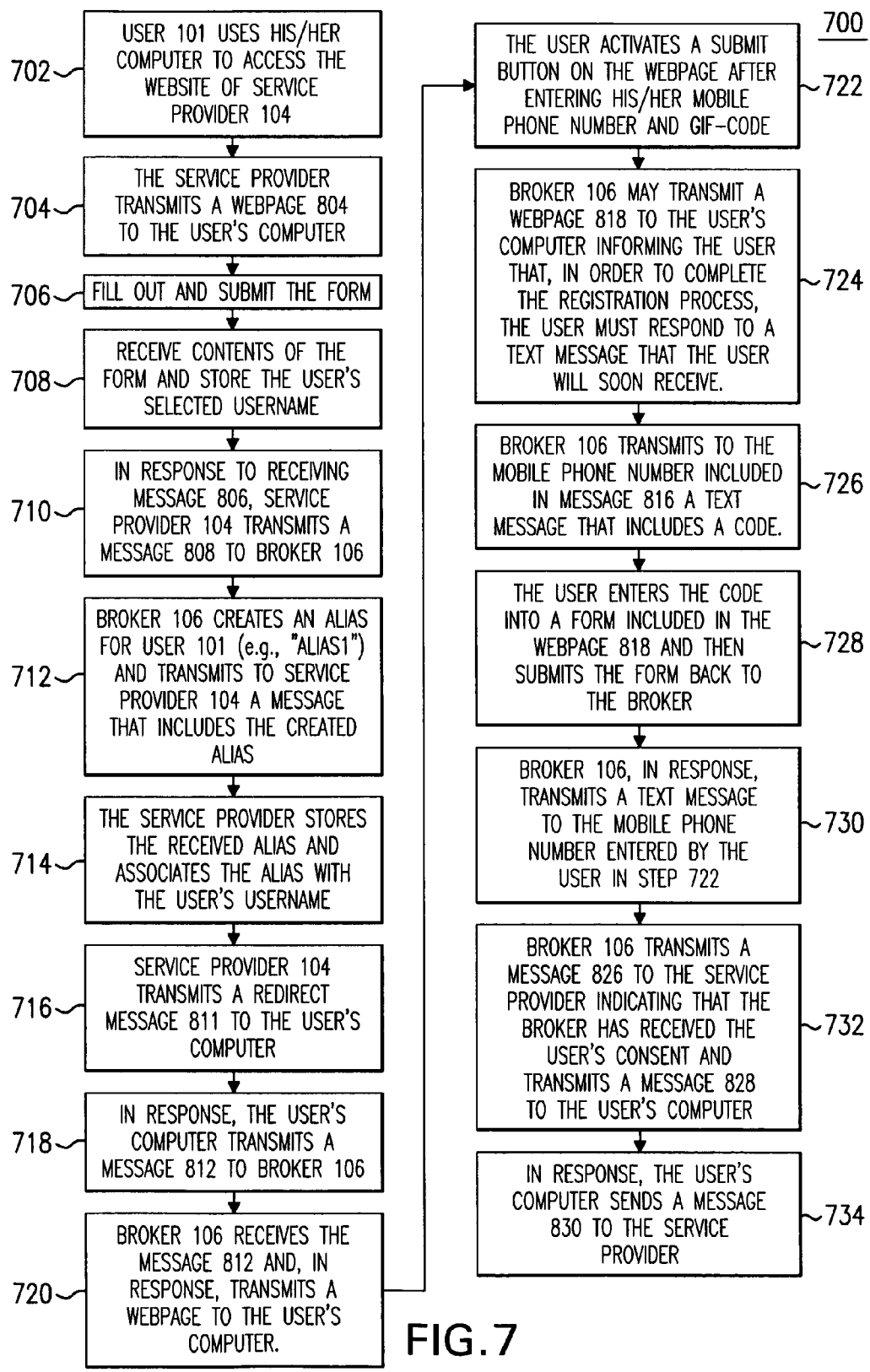
FIG. 7 is a flow chart illustrating a process according to an embodiment of an aspect of the invention.

Referring now to FIG. 7, FIG. 7 is a flow chart illustrating a process 700, according to another embodiment of the invention, for receiving consent from a user who is using his/her personal computer to sign up for a service provided by a service provider. Process 700 may begin in step 702, where a user 101 uses his/her computer to access the website of the service provider 104 for the purpose of registering for a service provided by service provider 104.

Figure 8:
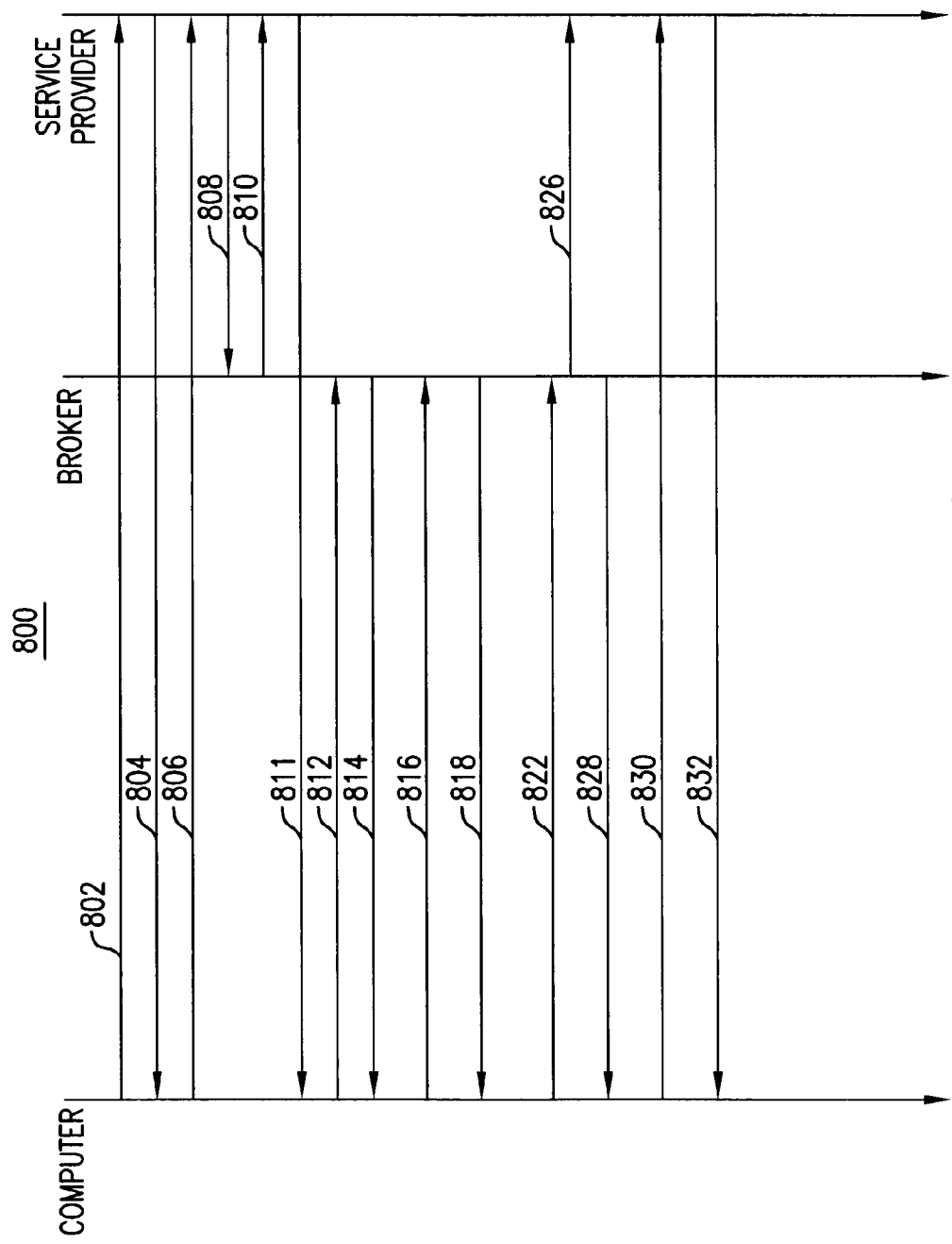
FIG. 8 is a data flow diagram illustrating a data flow according to an embodiment of an aspect of the invention.

More specifically, as shown in the data flow diagram 800 (see FIG. 8), in step 702, user 101's computer transmits to service provider 104 a message 802 (e.g., message 802 may be an HTTP GET request). In response to receiving message 802, service provider 104 transmits a webpage 304 (see FIG. 4) to user 101 (step 704).

As shown in FIG. 4, if user 101 would like to register for the service provided by service provider 104, user 101 fills out and submits the form included in the webpage (step 706). As shown, the form includes an input field for the user to enter a username, a checkbox to indicate that the user consents to allow service provider to make use of user 101's user information, and a submit button. When the user presses the submit button, a message 806 that includes the user's username is transmitted back to service provider 104.

In step 708, service provider 104 receives message 806 and stores the username included in the message. In step 710, in response to receiving message 806, which signals the user's consent to allow service provider 104 to use user information related to user 101, service provider 104 transmits a message 808 to broker 106. Message 808 may be transmitted using the SOAP protocol or other protocol.

In step 712, in response to receiving message 808, broker 106 creates an alias for user 101 (e.g., "alias1") and transmits to service provider 104 a message 810 that includes the created alias. Message 810 may also include a URI that includes a unique alias identifier (a.k.a., "transaction identifier"), which transaction identifier may be or include the created alias. The service provider stores the received alias and associates the alias with user 101's username (step 714).

Next (step 716), service provider 104 transmits a message 811 to the user's computer, which message may include the URI. This message 811 causes the user's computer to send a message 812 to broker 106 (e.g., message 811 may be an HTTP redirect message and message 812 may be an HTTP Get request message) (step 718). Message 812 preferably includes the transaction identifier.

In step 720, broker 106 receives the message 812 and, in response, transmits a message 814 to the user's computer. Message 814 may be a webpage that prompts the user to enter his/her mobile phone number (i.e., MSISDN). The webpage may include a logo owned by the operator that provides mobile phone services to the user. Additionally, to ensure that broker 106 is communicating with a human being as opposed to a computer program, the webpage may include a GIF-code ("captcha") (i.e., letter/numbers embedded in a picture).

In step 722, the user enters his/her MSISDN into the webpage along with the GIF-code and then causes his/her computer to transmit to broker 106 a message 816 that includes the information the user entered into the webpage (e.g., the user activates a submit button on the webpage after entering his/her mobile phone number and GIF-code).

In step 724, broker 106, in response to message 816, may transmit a webpage 818 to the user's computer informing the user that, in order to complete the registration process, the user must respond to a text message that the user will soon receive. In step 726, broker 106 transmits to the mobile phone number included in message 816 a text message that includes a code (e.g., a one-time code). The text message may also include the text shown in webpage 1600.

In step 728, the user enters the code into a form included in webpage 818 and then submits the form back to the broker 106 (i.e., in response to the user activating a button or like on the webpage 818, the user's computer sends a message 822 to broker 106, which message will include the code entered by the user).

In step 730, broker 106, in response to receiving message 822, transmits a text message (e.g., via SMS or other message service) to the mobile phone number entered by the user in step 722. The message indicates to the user that the broker has received the user's consent to forward user information to the service provider. Preferably, the text message includes a link that the user can activate if the user desires to revoke the consent.

In step 732, broker 106, also in response to receiving message 822, transmits a message 826 to the service provider indicating that the broker has received the user's consent and transmits a message 828 to the user' computer. Message 828 is a redirect message that causes the user's computer to send a message 830 (e.g., an HTTP GET request message) to the service provider (step 734). The service provider responds to message 830 by transmitting a message 832 (e.g., a web page) to the user's computer. Message 832 may inform the user that the user has successfully registered for the service.

Figure 9:
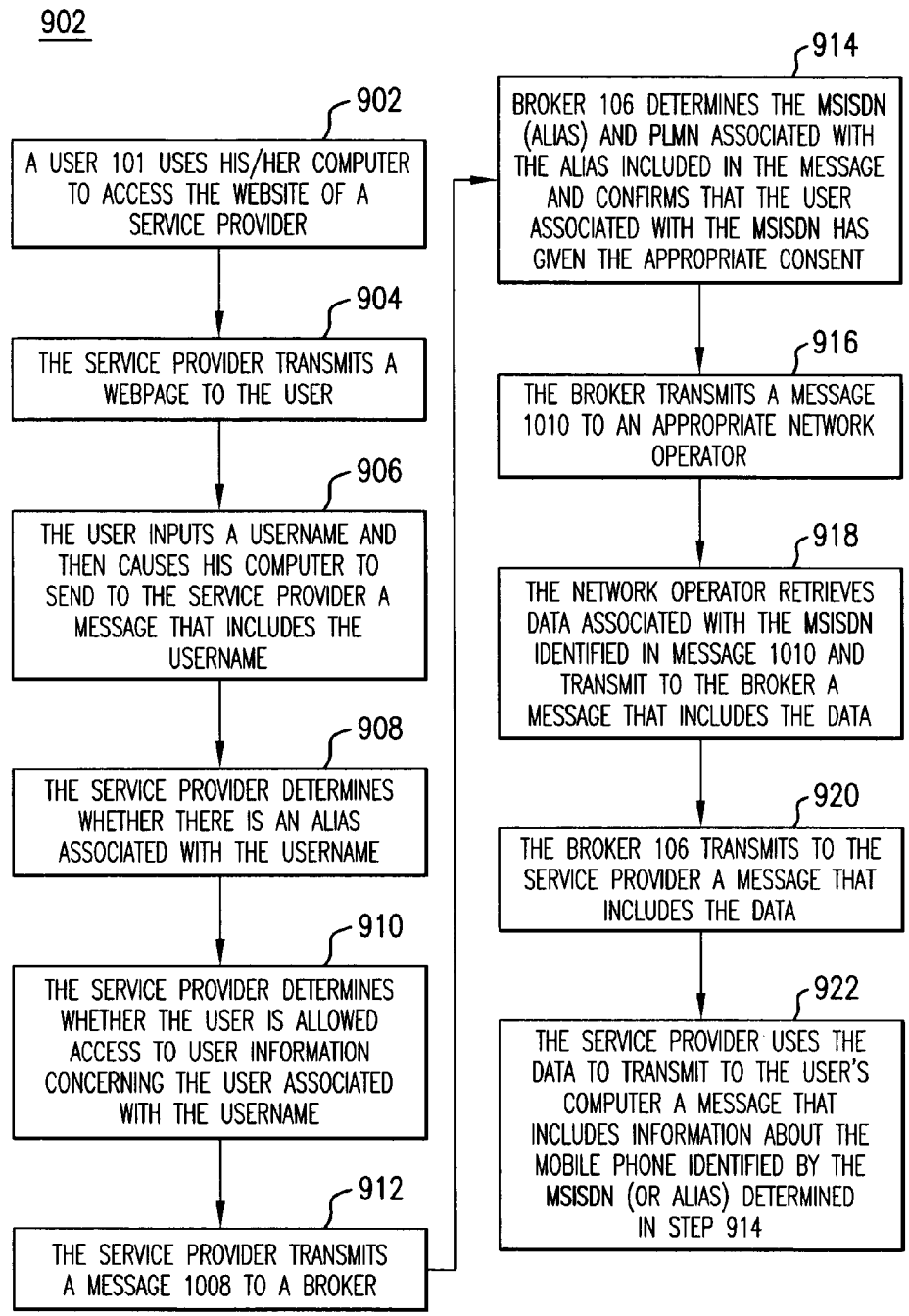
FIG. 9 is a flow chart illustrating a process according to an embodiment of an aspect of the invention.
Figure 10:
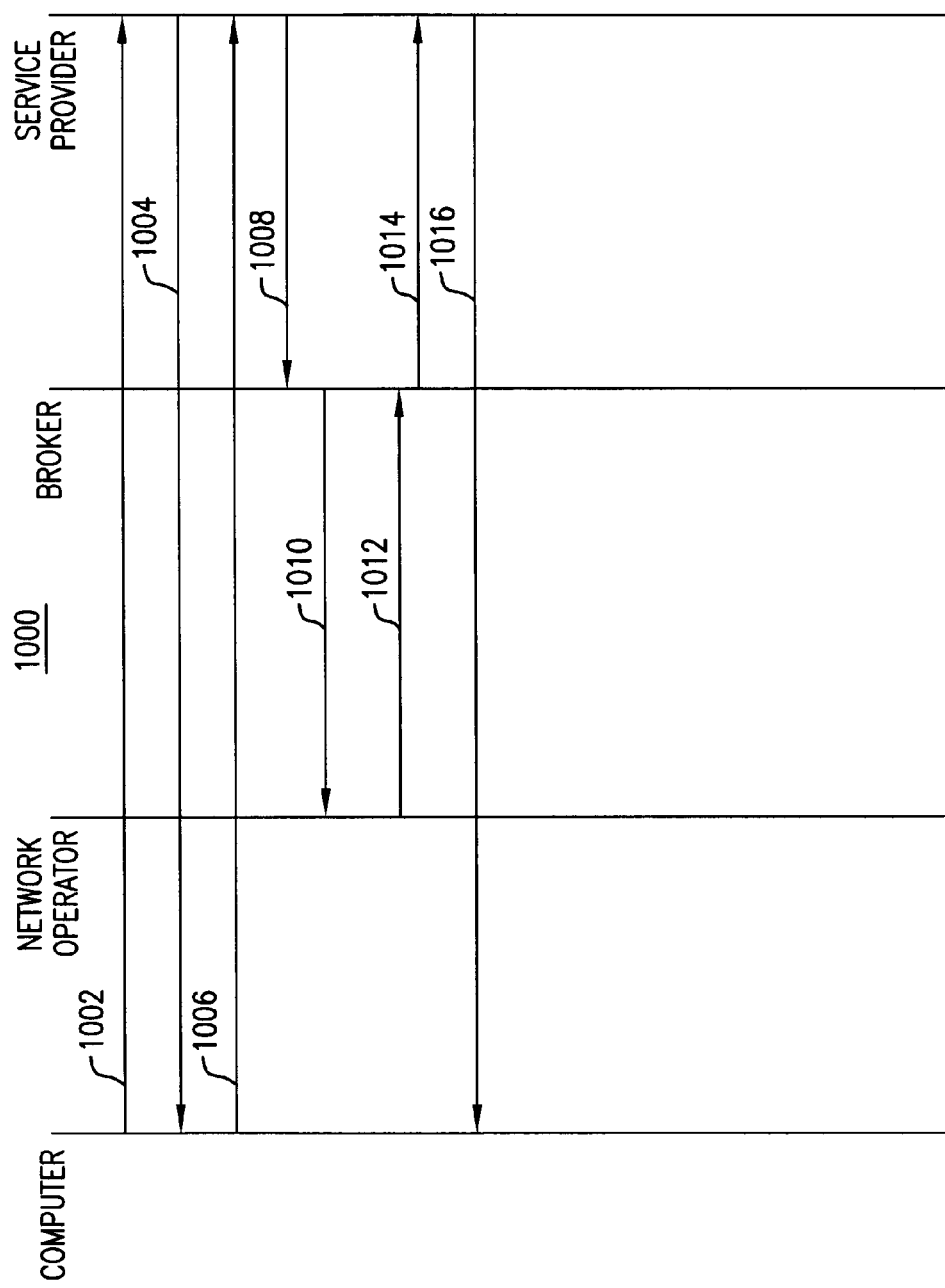
FIG. 10 is a data flow diagram illustrating a data flow according to an embodiment of an aspect of the invention.

Referring now to FIG. 9, FIG. 9 is a flow chart illustrating a process 900 for providing a service to a user, which service utilizes user information (e.g., user location information). Process 900 assumes that process 500 or 700 has previously been performed. Process 900 may begin in step 902, where a user 101 uses his/her computer to access the website of a service provider 104 for the purpose of receiving information provided by the service provider (e.g., user location information). More specifically, as shown in the data flow diagram 1000 (see FIG. 10), in step 902, user 101's computer transmits to service provider 104 a message 1002 (e.g., message 1002 may be an HTTP GET request).

In response to receiving message 1002, service provider 104 transmits a webpage 1004 to user 101 (step 904). Webpage 1004 may include an input box into which the user may input a username (e.g., the username belonging to a friend or spouse of the user).

In step 906, the user enters a username into the input box and then causes his/her computer to send to the service provider a message 1006 that includes the entered username (e.g., the user activates a "submit" button that is included in webpage 1004.

In step 908, the service provider, in response to receiving message 1006, determines whether there is an alias associated with the username. If not, an error message may be sent to the user. Otherwise, the service provider determines whether the user is allowed access to user information concerning the user associated with the username (step 910). If not, an error message may be sent to the user. Otherwise, the service provider transmits an information request message 1008 to broker 106 (step 912). Message 1008 preferably includes the alias determined in step 908.

In step 914, broker 106, in response to receiving message 1008, determines the MSISDN (or MSISDN alias) and PLMN associated with the alias included in message 1008 and confirms that the user associated with the MSISDN has given the appropriate consent (i.e., the user has provided consent for forwarding a particular type of user information from the operators network to the particular service provider). Next (step 916), broker 106 transmits a message 1010 to a user information server 192 of the appropriate network operator 102. Message 1010 includes the MSISDN (or MSISDN alias) determined in step 914.

In step 918, network operator 102, in response to message 1010, retrieves data (e.g., location data) associated with the MSISDN identified in message 1010 and transmit to broker 106 a message 1012 that includes the data. In step 920, broker 106, in response to message 1012, transmits to the service provider a message 1014 that includes the data. Next (step 922), the service provider, in response to message 1014, uses the data to transmit to the user's computer a message 1016 that includes information about the mobile phone identified by the MSISDN (or alias) determined in step 914. For example, message 1016 may be a webpage that includes a map showing the location of the mobile phone. In this manner a user can receive information about a friend's or spouse's phone, provided, of course, that the friend or spouse has given consent to broker and service provider to share this type of information with third parties.

Figure 11:
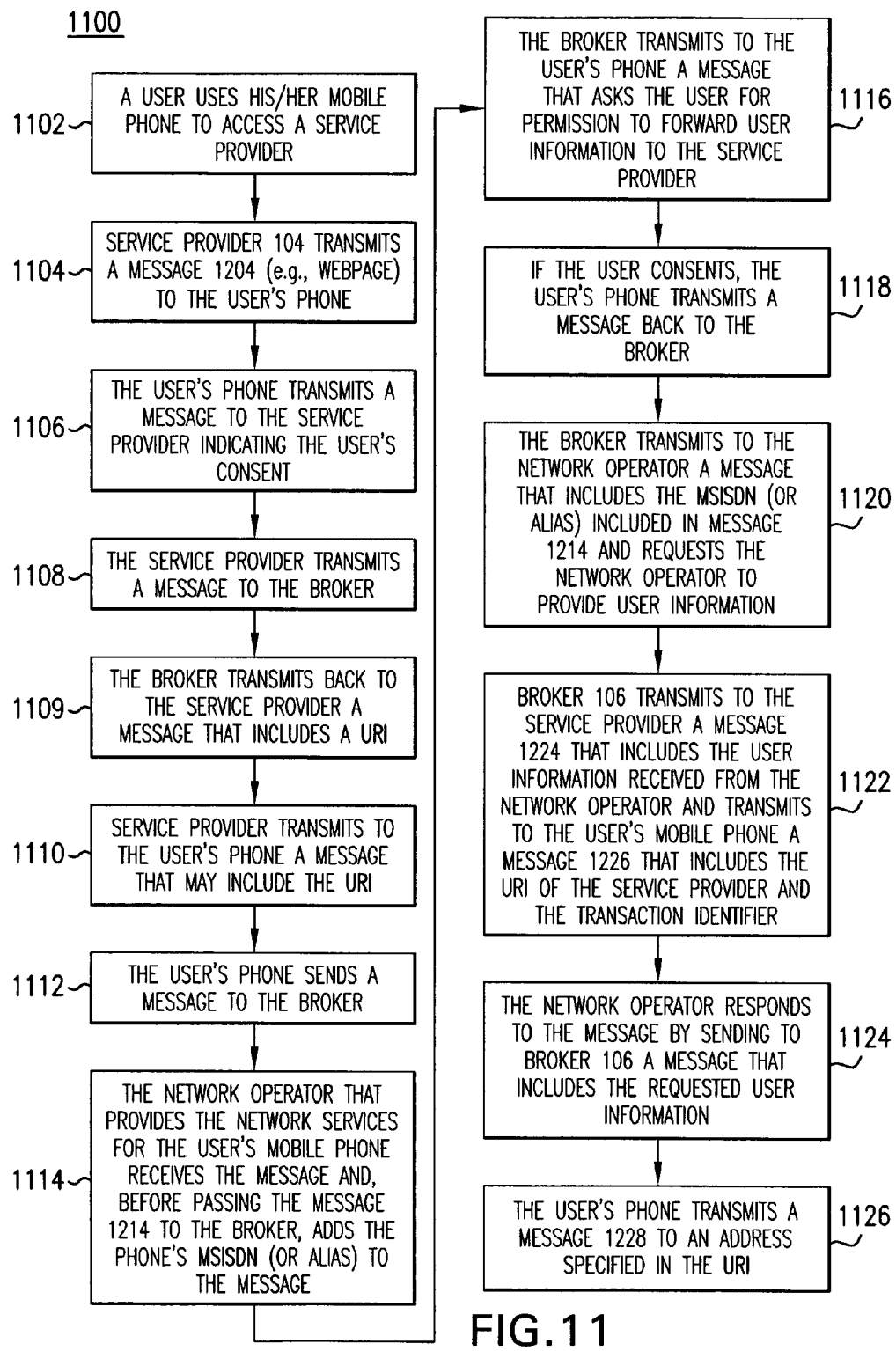
FIG. 11 is a flow chart illustrating a process according to an embodiment of an aspect of the invention.
Figure 12:
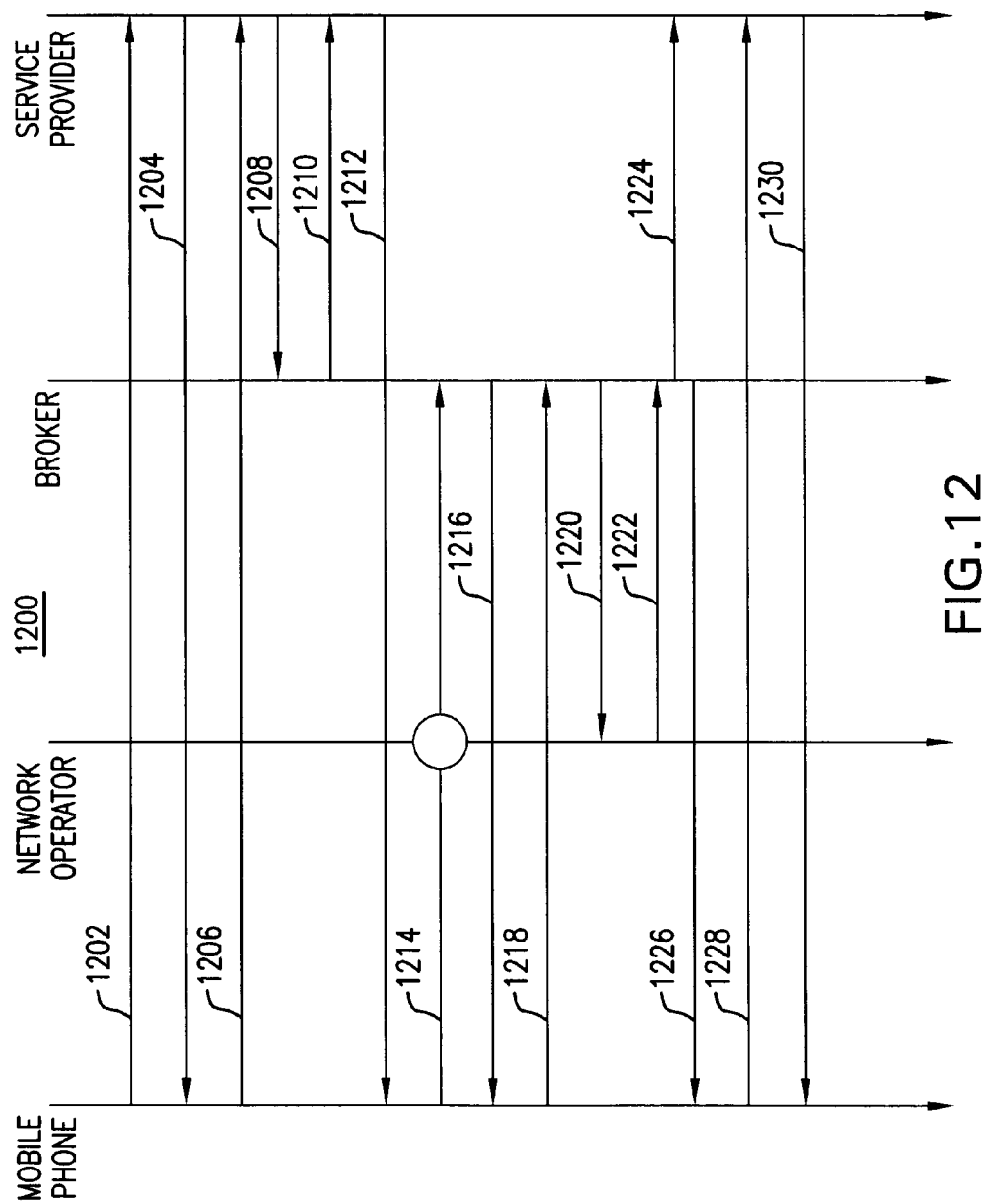
FIG. 12 is a data flow diagram illustrating a data flow according to an embodiment of an aspect of the invention.

Referring now to FIG. 11, FIG. 11 is a flow chart illustrating a process 1100 for providing a pull type service to a user who is not registered with the service provider. Process 1100 may begin in step 1102, where a user 101 uses his/her mobile phone to access the service provider for the purpose of receiving information provided by the service provider. More specifically, as shown in the data flow diagram 1200 (see FIG. 12), in step 1102, user 101 uses his/her mobile phone to transmit to service provider 104 an information request message 1202 (e.g., an HTTP request).

In response to receiving message 1202 from the user's phone, service provider 104 transmits a message 1204 (e.g., webpage) to the user's phone (step 1104). Message 1204 may inform the user that, for the service requested by the user, the service provider would like to collect information regarding the user's mobile phone (e.g., the location of the mobile phone), but the user will remain anonymous. When message 1204 is displayed to the user, a button or the like may be displayed and if the user activates the button the user is either giving explicit or implicit consent to have the service provider collect the desired information. When the user activates the button (or other like control element, such as a hyperlink), the user's phone transmits a message 1206 to the service provider, which message indicates the user's consent (explicit or implicit) to have the service provider collect the desired information (step 1106).

In response to message 1206, the service provider transmits a message 1208 to broker 106 (step 1108). Broker 106, in response to message 1208, transmits back to the service provider a message 1210 that includes a URI that may include a transaction identifier (step 1109).

Next (step 1110), service provider 104 transmits a message 1212 to the user's phone, which message may include the URI. This message 1212 causes the user's phone to send a message 1214 to broker 106 (e.g., message 1212 may be an HTTP redirect message, the URI may identify broker 106, and message 1214 may be an HTTP Get request message) (step 1112). Message 1214 preferably includes the transaction identifier.

In step 1114, the network operator that provides the network services for the user's mobile phone receives message 1214 and, before passing the message 1214 to broker 106, adds the phone's MSISDN (or an alias associated with the phone's MSISDN) to message 1214 so that the broker 106 will receive the MSISDN (or alias) along with message 1214. The operator may also include a PLMN identifier in message 1214.

In step 1116, broker 106, in response to receiving message 1214, transmits to the user's phone a message 1216, which asks the user for permission to forward user information to the service provider. If the user consents (e.g., by clicking on a particular link or button), the user's phone transmits a message 1218 back to broker 106 (step 1118). Preferably, messages 1216 and 1218 include the transaction identifier (or some identifier associated with the transaction identifier). Steps 1116 and 1118 may not be required if the user has previously given such consent and such previous consent is still valid.

Next (step 1120), broker 106 transmits to a user information server a message 1220 that includes the MSISDN (or alias) included in message 1214. Message 1220 requests the network operator to provide user information (e.g., location information or other user information) to the sender of the message.

In step 1122, the network operator responds to message 1220 by sending to broker 106 a message 1222 that includes the requested user information. Next (step 1124), broker 106 transmits to the service provider a message 1224 that includes the user information received from the network operator and transmits to the user's mobile phone a message 1226 that includes the URI of the service provider and the transaction identifier.

Message 1226 is preferably a redirect message that causes the user's phone to transmit a message 1228 to an address specified on the URI included in message 1226, which URI identifies the service provider (step 1126). Message 1228 preferably includes the transaction identifier. The service provider, in response to message 1228, transmits to the user's phone a message 1230. Message 1230 may include the user information received from broker 106 and/or may include information (e.g., an advertisement) that was selected based on the received user information. In this manner, service provider is able to acquire information about its users, while the user's remain anonymous. Moreover, as illustrated above, the process ensures that the target user (about which user information is given) is the same as the requesting user, and this is done by redirecting the session to the broker, which can automatically identify the requesting user by the MSISDN (or alias) included from the operators gateway.

In at least some of the embodiments described above, broker 106 may be configured to occasionally (e.g., periodically) require the user to confirm that the user still consents to the broker 106 being able to forward user information concerning the user to one or more service providers. Accordingly, in some embodiments, broker 106 occasionally transmits a text message to the user's mobile phone instructing the user to activate a link in the text message if the user consents to the broker 106 being able to forward user information concerning the user to one or more service providers.

When the user clicks the link, the user's phone will transmit a message to broker 106. If within some predetermined amount of time after sending the text message, the broker 106 has not received this message from the user's phone, then the broker 106 will assume that the user has withdrawn his/her previous consent and update its database accordingly. Also, for each service provider, broker 106 may send to the service provider a message that includes the alias associated with the user's MSISDN, which message informs the service provider that the broker 106 no longer has consent for the user identified by the alias.

In some alternative embodiments, broker 106 may be configured to occasionally (e.g., periodically) transmits a message to the user's mobile phone informing the use that if the user would like to withdraw his/her consent, the user may do so by simply activating a link included in the message.

Additionally, in some embodiments, a user may withdraw, at any time, the consent previously given to broker 106. For example, in some embodiments, the user can withdraw consent simply by clicking on a particular link contained in a message that was previously received from broker 106, which link when clicked on causes the user's phone to send a predetermined message to broker 106. In response to receiving this message, broker 106, for each service provider, may send to the service provider a message that includes the alias associated with the user's MSISDN, which message informs the service provider that the broker 106 no longer has consent for the user identified by the alias.

Figure 13:
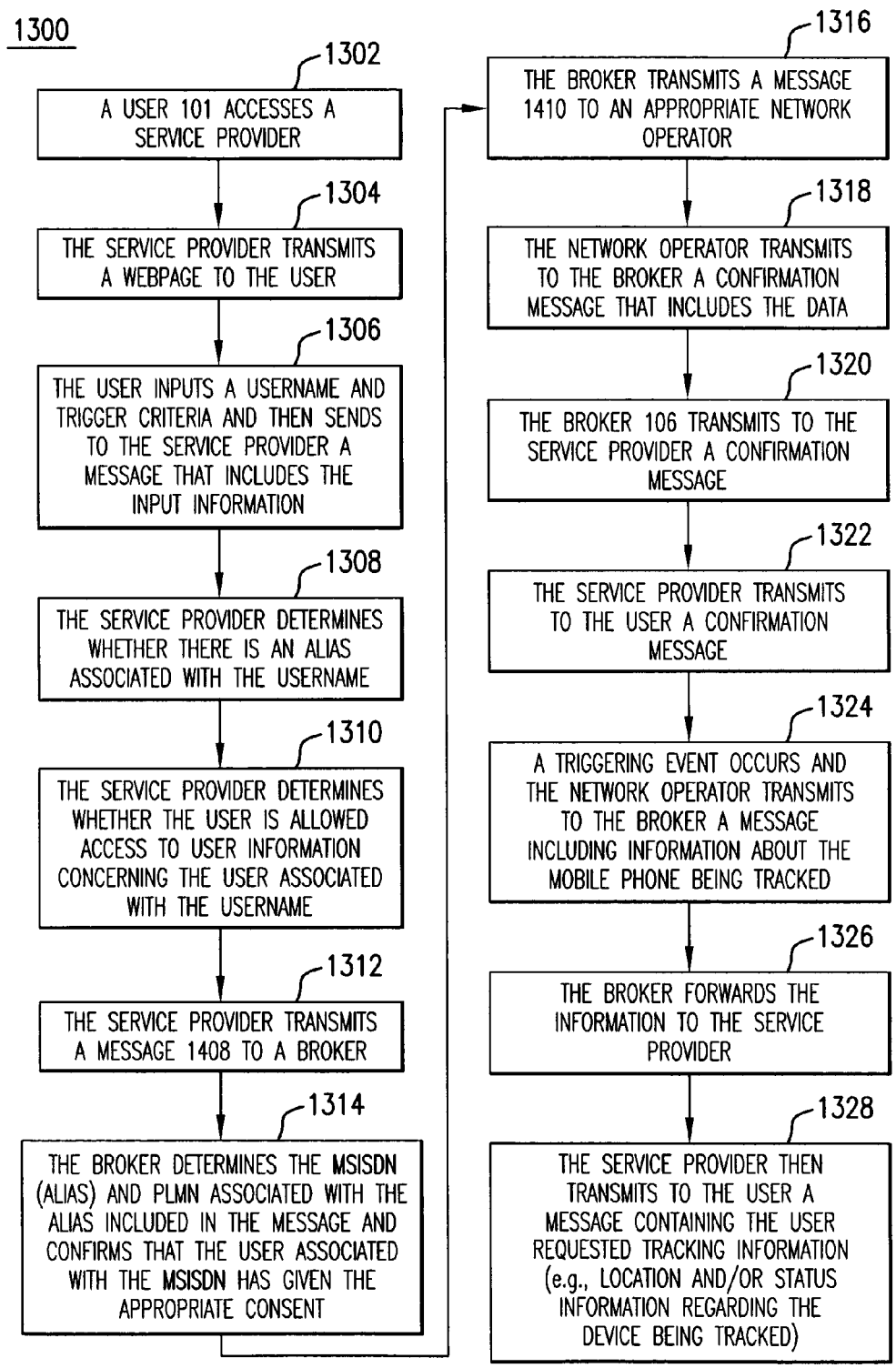
FIG. 13 is a flow chart illustrating a process according to an embodiment of an aspect of the invention.
Figure 14:
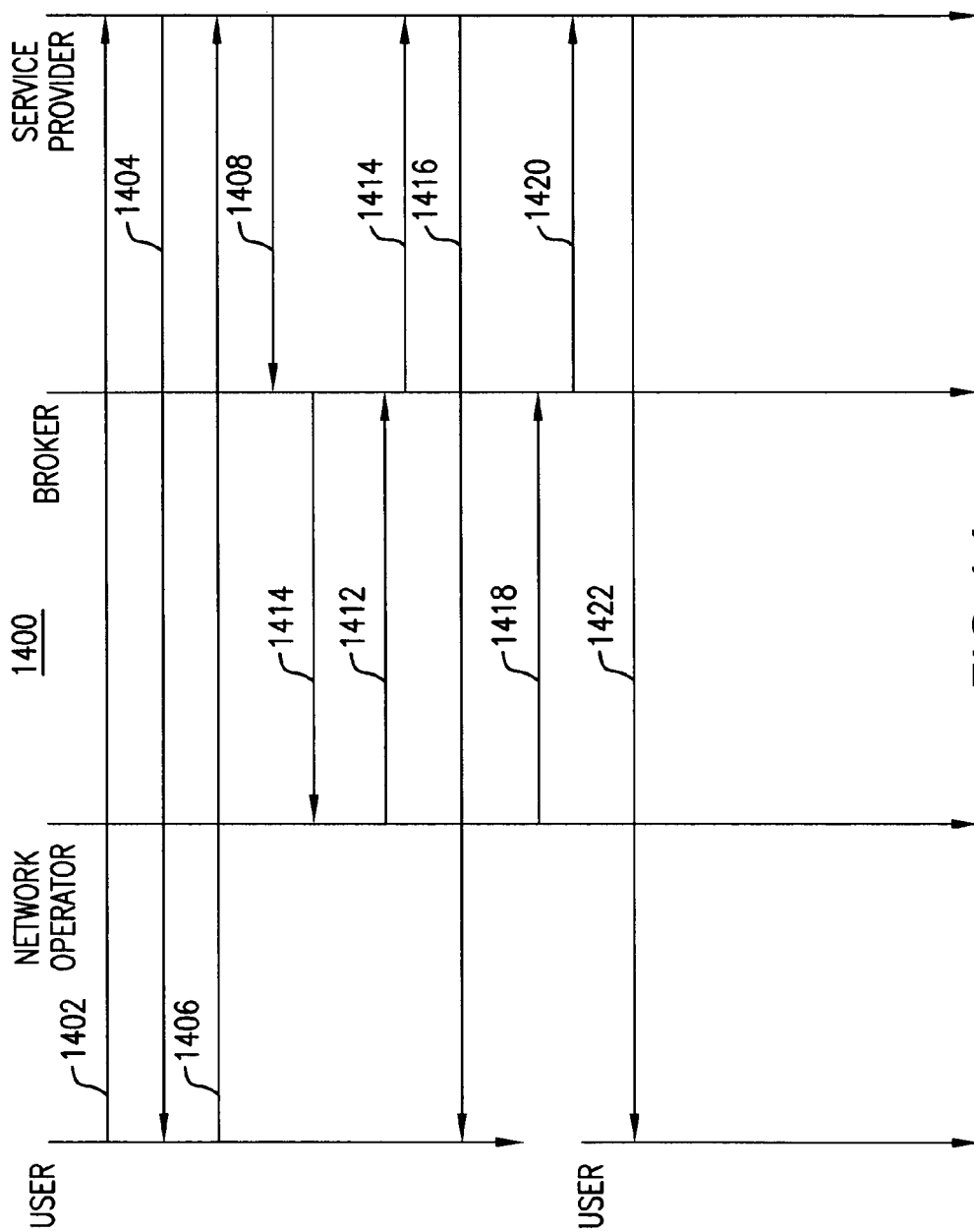
FIG. 14 is a data flow diagram illustrating a data flow according to an embodiment of an aspect of the invention.

Referring now to FIG. 13, FIG. 13 is a flow chart illustrating a process 1300 for providing a user tracking/notification service to a user. Process 1300 may begin in step 1302, where a user 101 uses a communication device (e.g., computer, phone or other communication capable device) to access a service provider 104 for the purpose of receiving tracking information. As shown in the data flow diagram 1400 (see FIG. 14), in step 1302, user transmits to service provider 104 a message 1402 (e.g., message 1402 may be an HTTP GET request).

In response to receiving message 1402, service provider 104 transmits a message 1404 (e.g., a webpage) to user 101 (step 1304). Message 1404 may include an input box into which the user may input a username (e.g., the username belonging to a friend or spouse of the user) and enable the user to specify a trigger criteria (e.g., when the target user enters a certain geographical area) and a notification address (e.g., the phone number of a device or e-mail address at which the user would like to receive the tracking information).

In step 1306, the user enters a username, trigger criteria, and notification address and then sends to the service provider a message 1406 that includes the entered username, trigger criteria information, and notification address.

In step 1308, the service provider, in response to receiving message 1406, determines whether there is an alias associated with the username. If not, an error message may be sent to the user. Otherwise, the service provider determines whether the user is allowed access to location tracking information concerning the user associated with the username (step 1310). If not, an error message may be sent to the user.

Otherwise, the service provider transmits a message 1408 to broker 106 (step 1312). Message 1408 includes the alias determined in step 1308 and the trigger criteria information.

In step 1314, broker 106, in response to receiving message 1408, determines the MSISDN (or MSISDN alias) and PLMN associated with the alias included in message 1408 and confirms that the user associated with the MSISDN has given the appropriate consent (i.e., the user has provided consent for forwarding a particular type of user information from the operators network to the particular service provider). If the user has not given the appropriate consent, then broker 106 may so notify the service provider, which may then notify the requesting user that the service provider does not have consent to track the target user identified by the username entered by the user.

Assuming the user has consent, broker 106 transmits a message 1410 to the appropriate network operator 142 (step 1316). Message 1410 includes the MSISDN (or MSISDN alias) determined in step 1314 and the notification trigger criteria information and requests that the operator send notifications to the broker regarding the device associated with the MSISDN (or alias) included in message 1410 in accordance with the notification trigger criteria information.

In step 1318, network operator 142, in response to message 1410, transmit to broker 106 a confirmation message 1412. In step 1320, broker 106, in response to message 1412, transmits to the service provider a confirmation message 1414. Next (step 1322), the service provider, in response to message 1414, transmits to the user a confirmation message 1416 indicating that user tracking is now enabled.

In step 1324, the network operator determines, based on the triggering criteria information, that a triggering event has occurred and, thus, transmits a message 1418 to the broker. Message 1418 includes the MSISDN (or alias) determined in step 1314 and information concerning the location and/or status of the mobile phone identified by the MSISDN (or alias).

In step 1326, broker 106, in response to message 1418, transmits to the service provider a message 1420 that includes the location/status information concerning the mobile phone. Next (step 1328), the service provider, in response to message 1420, uses the information to transmit to the notification address a message 1422 that includes information (e.g., location and/or status information) about the mobile phone identified by the MSISDN (or alias) determined in step 1314. For example, message 1422 may be a webpage or text message that includes a map or other information showing the location of the mobile phone. In this manner a user can receive notifications about a friend's or spouse's phone, provided, of course, that the friend or spouse has given consent to broker and service provider to share this type of information with third parties.

Referring now to FIG. 15, FIG. 15 is a functional block diagram of a broker server 196 according to an embodiment of the invention. Broker server 196, as illustrated in FIG. 15, may include a receiver 1502, a transmitter 1504, a storage unit 1506, and a data processing unit 1508 coupled to the receiver, transmitter and storage unit. While the receiver and transmitter are shown as separate boxes, this was done solely for illustration as it is well known that a transceiver can function as a receiver and transmitter. Storage unit 1506 may store software 1510 that when run by the data processing unit causes the data processing to function as described above in connection with the description of the various flow charts.

While various embodiments/variations of the present invention have been described above, it should be understood that they have been presented by way of example only, and not limitation. Thus, the breadth and scope of the present invention should not be limited by any of the above-described exemplary embodiments. Further, unless stated, none of the above embodiments are mutually exclusive. Thus, the present invention may include any combinations and/or integrations of the features of the various embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A method for providing user information to a service provider system, the method comprising:
    receiving, at a broker server, a message including a communication device identifier associated with a communication device, wherein the step of receiving the message including the communication device identifier comprises receiving said message from a network operator gateway providing network services to the communication device;
    transmitting from the broker server to a user of the communication device a consent request message seeking the user's consent for the broker to provide information about the user to the service provider system;
    receiving from the user a response to the consent request message, which response indicates that the user has provided the requested consent; and
    in response to receiving the response to the consent request message, transmitting a consent confirmation message to the service provider system, wherein
    the consent confirmation message originated at the broker server and does not include any of said information about the user,
    the service provider system is separate and distinct from the network operator gateway, and
    the method further comprises transmitting a redirect message to the communication device in response to receiving the response to the consent request message, wherein the redirect message is configured to cause the communication device to automatically transmit to the service provider system a hypertext transfer protocol (HTTP) request.

2. The method of claim 1, further comprising storing, at the broker server, the communication device identifier with an identifier associated with the user of the communication device so that the communication device identifier is associated with the identifier associated with the user.

3. The method of claim 2, wherein the communication device identifier is (a) a Mobile Systems International Subscriber Identity Number (MSISDN) associated with the communication device or (b) an alias associated with a MSISDN associated with the communication device.

4. The method of claim 3, further comprising:
    receiving an activate message from the service provider prior to receiving the message that includes the communication device identifier; and
    in response to the activate message, generating or selecting an alias and transmitting an alias response message to the service provider, wherein the alias response message includes an alias identifier for identifying the generated or selected alias.

5. The method of claim 4, wherein the identifier associated with the user is the generated or selected alias.

6. The method of claim 5, wherein the alias identifier included in the alias response message consists of the generated or selected alias.

7. The method of claim 3, wherein
    the step of transmitting the consent request message to the user is performed in response to receiving the message from the network operator gateway that includes the communication device identifier, and
    the message that includes the communication device identifier is a hypertext transfer protocol (HTTP) request message.

8. The method of claim 7, further comprising transmitting a redirect message to the user in response to receiving from the user the message including the communication device identifier wherein the redirect message causes the communication device to automatically transmit a request to the service provider system.

9. The method of claim 7, wherein the step of transmitting the consent request message to the user consists of transmitting to the communication device a text message using a messaging protocol that is different than the HTTP protocol.

10. The method of claim 9, wherein the text message includes a link that when activated causes the communication device to transmit said response to the consent request message.

11. The method of claim 9, wherein
    the step of receiving the message including the communication device identifier comprises receiving said message from a computer operated by a user of the communication device, and
    the method further comprises, in response to receiving the message that includes the communication device identifier, transmitting to said computer a web page.

12. The method of claim 11, wherein the text message includes a code and a form is included in the webpage for enabling the user to enter the code, and
    the method further comprises receiving, at the broker, the code in response to the user entering the code into the form and submitting the form back to the broker.

13. The method of claim 1, further comprising:
    receiving from the service provider an information request message that includes an identifier associated with the user;
    in response to receiving the information request message, using the identifier associated with the user to retrieve a communication device identifier associated with the identifier associated with the user;
    transmitting to a user information server that stores user information a second information request message, wherein the second information request message includes the retrieved communication device identifier;
    receiving from the user information server user information concerning the device identified by the communication device identifier; and transmitting an information response message to the service provider, which information response message includes the user information.

14. The method of claim 1, wherein the consent request message is (a) a web page or (b) transmitted using a short message service (SMS) or other text messaging protocol.

15. The method of claim 1, further comprising:
transmitting a text message to the communication device in response to receiving the response to the consent request message, wherein the text message (a) indicates that the user's consent to forward user information to the service provider has been received and (b) includes a link that the user can activate if the user desires to revoke the consent.

16. The method of claim 1, wherein
the step of receiving the message including the communication device identifier comprises receiving said message from a computer operated by a user of the communication device, wherein the computer does not use the communication device to transmit the message, and
the step of receiving from the user a response to the consent request message comprises receiving the response from the computer.

17. The method of claim 16, further comprising transmitting to the computer a form that prompts the user to manually input into the form the communication device identifier and that enables the user to cause the computer to transmit the message including the communication device identifier, wherein this transmitting step occurs prior to the step of receiving the message including the communication device identifier.

* * * * *